(12) United States Patent
Ghalambor et al.

(10) Patent No.: US 10,066,754 B2
(45) Date of Patent: Sep. 4, 2018

(54) TOILET WATER LEAK AND FLOOD PREVENTION

(71) Applicants: Masoud Ghalambor, El Dorado Hills, CA (US); Mohammad Reza Ehsani, Tucson, AZ (US)

(72) Inventors: Masoud Ghalambor, El Dorado Hills, CA (US); Mohammad Reza Ehsani, Tucson, AZ (US)

( * ) Notice: Subject to any disclaimer, the term of this patent is extended or adjusted under 35 U.S.C. 154(b) by 0 days.

(21) Appl. No.: 15/178,340

(22) Filed: Jun. 9, 2016

(65) Prior Publication Data

US 2017/0356559 A1    Dec. 14, 2017

(51) Int. Cl.
| | |
|---|---|
| *E03D 1/30* | (2006.01) |
| *F16K 21/16* | (2006.01) |
| *E03D 1/32* | (2006.01) |
| *E03D 1/36* | (2006.01) |
| *F16K 21/18* | (2006.01) |
| *F16K 31/02* | (2006.01) |

(52) U.S. Cl.
CPC ............... *F16K 21/16* (2013.01); *E03D 1/30* (2013.01); *E03D 1/32* (2013.01); *E03D 1/36* (2013.01); *F16K 21/18* (2013.01); *F16K 31/02* (2013.01)

(58) Field of Classification Search
CPC .... E03D 1/30; E03D 1/32; E03D 1/36; F16K 21/16; F16K 21/18; F16K 31/02
USPC ................. 137/410, 412, 624.11; 251/294
See application file for complete search history.

(56) References Cited

U.S. PATENT DOCUMENTS

| | | | | |
|---|---|---|---|---|
| 6,058,519 A | * | 5/2000 | Quintana | E03D 1/00 137/392 |
| 6,671,893 B1 | * | 1/2004 | Quintana | E03D 3/00 4/427 |
| 7,000,627 B1 | * | 2/2006 | Johnson | E03D 1/00 137/1 |
| 7,293,583 B2 | * | 11/2007 | Arigoni | E03D 5/10 137/624.11 |
| 7,392,817 B2 | * | 7/2008 | Burlage | F17D 5/06 137/1 |
| 8,310,369 B1 | * | 11/2012 | Canfield | E03D 1/00 340/605 |
| 2005/0241054 A1 | * | 11/2005 | McKenna | E03D 1/00 4/427 |
| 2010/0289652 A1 | * | 11/2010 | Javey | H04Q 9/00 340/605 |

(Continued)

OTHER PUBLICATIONS

NPL #1—Cesco Brass Newsflush—"How long should it take to fill the tank and how can that be regulated?"—FAQs—Jun. 8, 2006—Paul Bergstrom—https://www.cescobrass.com/newsflush.cfm?nid=81.*

*Primary Examiner* — Kevin Murphy

(57) ABSTRACT

Proactive methods and articles of manufacture are disclosed for preventing any water leak or flooding of a toilet. These methods and systems can replace or be added to the water system of existing toilets, especially the North American toilets, which use water tanks. In various embodiments the water is turned OFF and prevented to enter the toilet tank before the flush handle is activated and/or before a user is sensed. In some embodiments each flushing of the toilet permits the toilet tank to only fill once. If a leak causes the tank to empty, water is not permitted to fill the leaking tank until the next time the flush handle is activated. In some other embodiments each flushing of the toilet and/or sensing of a user permits the toilet tank to fill a predetermined number of times.

20 Claims, 3 Drawing Sheets

(56) References Cited

U.S. PATENT DOCUMENTS

2014/0366259 A1* 12/2014 Ahola .................. E03D 3/10
                                                                                                    4/358

* cited by examiner

TOILET WATER LEAK AND FLOOD PREVENTION

CROSS-REFERENCE(S) TO RELATED APPLICATION(S)

This application claims the benefit of the priority date of the U.S. Provisional Patent Applications No. 62/252,414, filed on Nov. 6, 2015, and entitled "Water Leak and Flood Prevention".

TECHNICAL FIELD

This application relates generally to the field of plumbing and construction. More specifically, this application relates to a method and device for preventing leaks and flooding as a result of a toilet system malfunction.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. It is emphasized that while this disclosure focuses on preventing the leak and flooding of toilets, the same principals apply to various other appliances such as water heaters, dishwashers, refrigerators that dispense chilled water, washers and dryers, etc.

Water leakage and home flooding are major sources of water waste and property damage in the United States. The average home loses 14% of its water to leaks. Property damage resulting from water damage due to plumbing failures and freezing pipes is the second most common cause of homeowner losses. Water caused $9.1 billion in annual homeowner policy property losses annually from 2007 to 2009—approximately 23% of all homeowner property losses. Up to 93% of the cost of water damage could have been prevented or minimized if an automatic water leak detection and shut-off system had been present in the homes, according to an ACE Private Risk Services study of damage sustained by affluent homeowners. With the shortage of water worldwide, it is imperative that new devices be developed to prevent loss of this precious commodity due to malfunctioning toilets or other appliances.

Sources of water leak in the home environment alone include: The toilet, washing machines, water dispensing refrigerators, dishwashers, etc. In the simple case of a home toilet system, water leaks can occur anywhere in the system, from the water inlet valve in the wall to the toilet tank flapper. Flooding can occur due to bursting of the flexible pipes or fractures of the plastic connectors between the pipes and the tank.

There are several products available to address components of this problem. For example, one system utilizes multiple flood sensors placed in key locations that are connected to a shut-off valve at the main water source. This system is passive, expensive, and only prevents floods and not the leaks. There are devices that attach to the side of the toilet tank and generate an audible alarm when a leak is detected in the tank. This inexpensive system, on the other hand, is not passive and alerts to a leak but not to a flooding. As a result very few homes use this device. The above mentioned prior art and commercially available devices are not proactive and merely react to incident of leakage or flooding after it happens and shut-off the water supply line when a leak or flood is detected.

Figure 1:
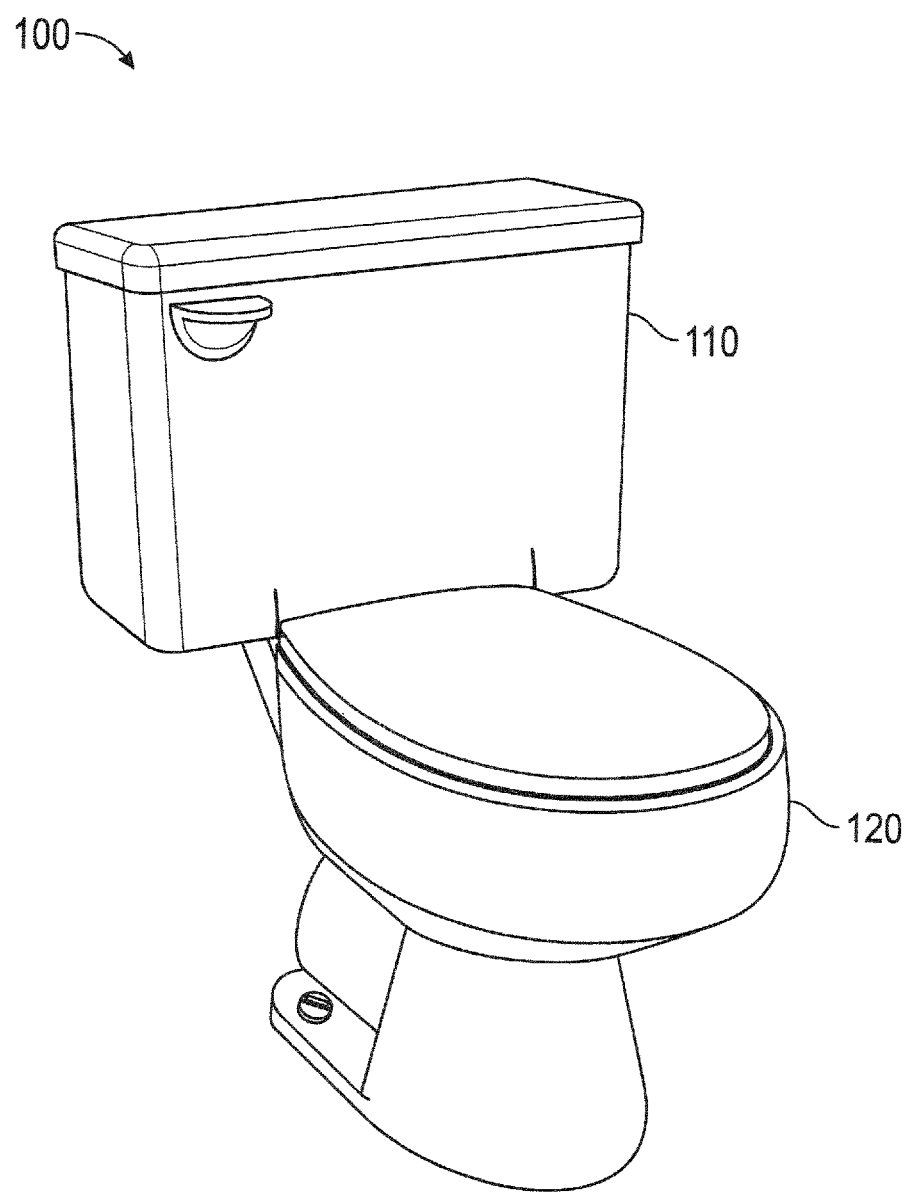
FIG. 1 shows an example of a typical North American toilet consisting of a water tank and a toilet bowl.

Briefly described, proactive methods and articles of manufacture are disclosed for "preventing" any water leak or flooding of a toilet. These methods and articles of manufacture can replace or be added to the water system of existing toilets, especially the North American toilets, which use water tanks. FIG. 1 is a perspective illustration of a typical North American toilet 100 consisting of a water tank 110 and a toilet bowl 120. In various embodiments of the present disclosure the water is turned off and prevented to enter the toilet tank before flushing is needed. In some embodiments each flushing of the toilet permits the toilet tank to only fill once. If a leak causes the tank to empty, water is not permitted to fill the leaking tank again, until the next time the flush handle is activated.

Figure 2:
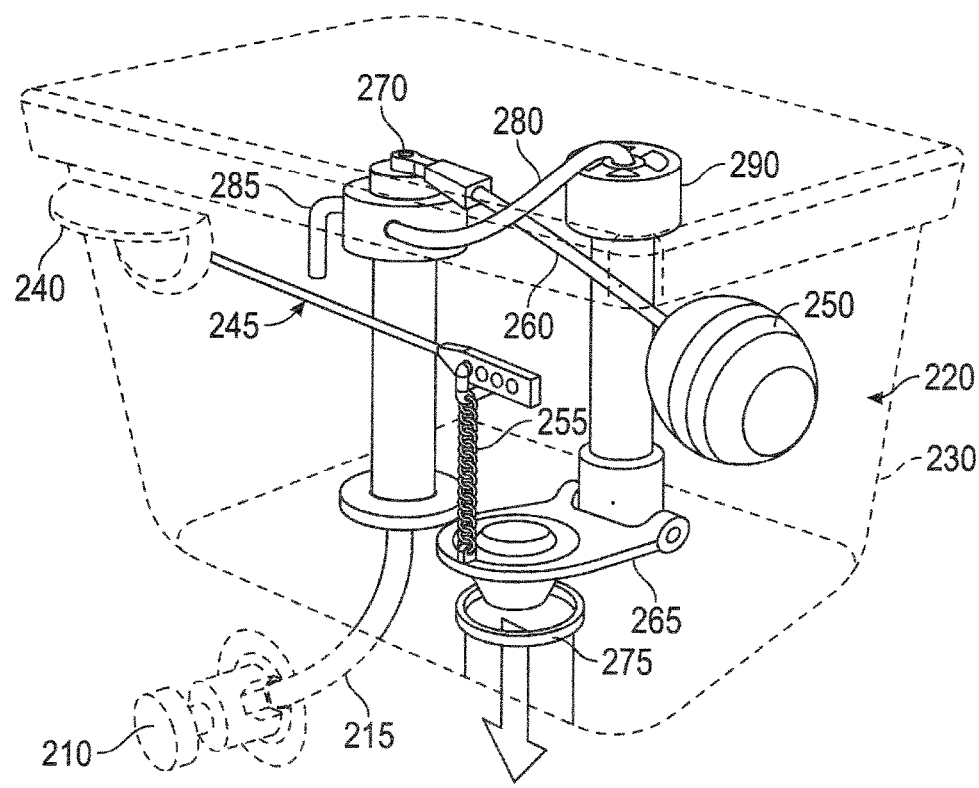
FIG. 2 shows an example of different parts of a typical water tank shown in FIG. 1.

FIG. 2 shows an example of different parts of a typical water tank shown in FIG. 1. To flush a toilet, the toilet handle 240 is pressed and the water stored in the tank 230 will flow into the toilet bowl situated under tank 230. To fill up the tank 230, an inlet valve connected to the tank-fill-tube 285 controls the water supply coming into the tank 230 from the water shut-off valve 210 through pipe 215. The water shut-off valve 210 is usually attached to the wall behind the toilet. The inlet valve lets water to flow into tank 230 when the tank is empty, and stops water coming in when the tank is full. The inlet valve is controlled by the float ball 250 through the float rod 260. As the water enters tank 230 and the float ball 250 rises, the float rod 260 presses against the inlet valve and shuts it off. The flow of water may be adjusted by the float-rod adjustment screw 270. When the tank 230 is full, up to a desired water level 220, the float rod 260 will be pressing against the inlet valve hard enough to turn the water completely off. This stops the tank 230 from overflowing.

When the toilet handle 240 is pressed, the trip lever 245 inside the tank 230 will pull the flapper valve 265 up by chain 255, opening the valve seat 275 and letting the water to gush into the toilet bowl. The tank 230 empties quite quickly, and the float ball 250 floats to the bottom of tank 230, letting the inlet valve open. In this configuration the float rod 260 no longer presses against the inlet valve, so water begins to flow into the tank 230, filling it up again. If the water inlet valve does not work properly, and water rises above the desired water level 220 and will enter the overflow tube 290 and will be directed to the toilet bowl before it reaches the top of tank 230. While this may prevent the water from overflowing the tank 230, it does not prevent water wasting as the water continues to dump into the toilet bowl through the overflow tube 290. In the current toilet designs, as long as the water inlet valve is open, some water is redirected to the toilet bowl by refill tube 280.

Figure 3:
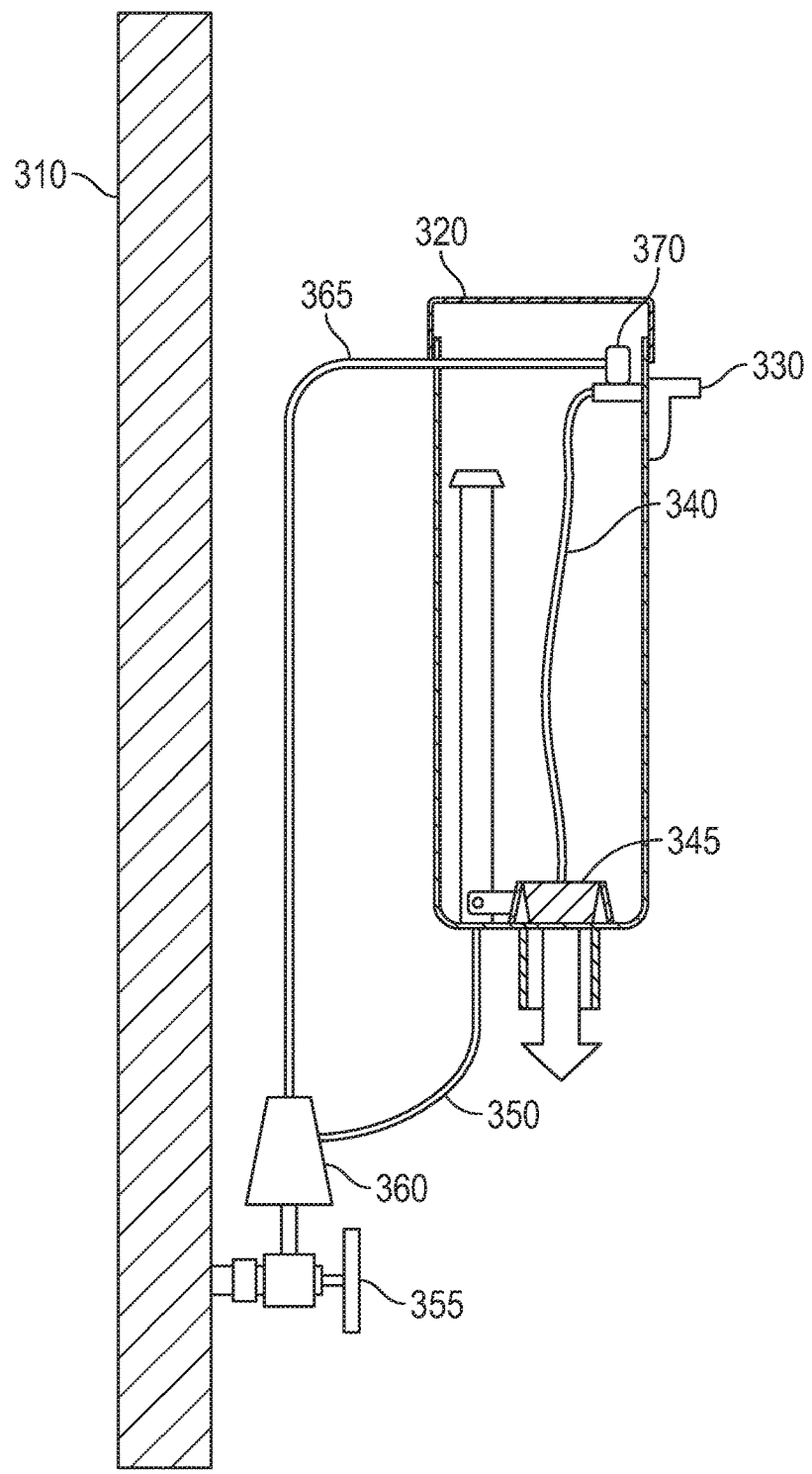
FIG. 3 shows an example embodiment of a flood and leakage prevention system according to the present disclosure.

One of the advantages of the disclosed method and system is the fact that flood and leak prevention is most effective when the default status of the water source is 'OFF' and that water flows into the toilet water tank only when necessary. FIG. 3 shows an example embodiment of a flood and leakage prevention system according to the present disclosure. In the embodiment shown in FIG. 3, a controllable ON-OFF valve 360, such as a solenoid valve and the like which is normally OFF, is placed between the water shut-off valve 355 and the water line 350 that feeds the toilet tank 320. The ON-OFF valve 360 is mechanically, electrically or wirelessly controlled by the flush handle 330 or any other flush actuating device or by sensors discussed below. When the ON-OFF valve 360 is turned ON, water is allowed to flow passed the water valve 355 into the water line 350. The water valve 355 is typically attached to a wall 310 against which the toilet is placed.

In some embodiments, each time the flush handle or the flush actuating device 330 is pushed, pulled, turned, or in general actuated, a signal is generated by switch 370 and sent to the ON-OFF valve 360 by wire 365 to turn ON the ON-OFF valve 360 and to allow the water to enter the toilet tank 320 for a predetermined length of time, such as for 60 seconds. Afterward, the ON-OFF valve 360 automatically cuts off the water line 350 and prevents the water to further enter the tank 320. As it is known to all those skilled in the art, the ON-signal generated by the flush-handle 330 may be electrical, mechanical, an RF signal or a combination thereof.

With the existing toilet designs, bursting of a flexible pipe (such as the water line 350 shown in FIG. 3) between the water inlet and the toilet tank or a fracture of the typically plastic connector between the flexible pipe and the bottom of the tank will result in continuous water loss at a high rate, depending on the size of the defect, until such time that a user detects and shuts the inlet valve off. However, with the disclosed design, the water loss is minimal in comparison, because the water flow is 'OFF', the water loss will be limited to that which is in the flexible pipe and the ball shut-off (inlet valve) vertical pipe. If the user does not notice the small leak and flushes the toilet, water will flow for a maximum of one minute through the burst pipe on the floor and the tank will not fill. In this situation, the user is present for flushing the toilet, the leak will be noticeable once the water flow is initiated and the user can shut off the valve as soon as it is noticed.

In various embodiments, the actuation of the ON-OFF valve 360 may have a predetermined delay with respect to the signal received from the flush actuator 330 to allow the water in the tank 320 to be completely drained and/or the flapper 345 to completely drop down before allowing the water to flow to the tank 320. The typical toilet tanks fill within one minute. In various embodiments the water-ON-time and/or the flush-actuation-delay can be adjusted as desired. Since the flush handle 330 pulls up the flapper 345 at the same time it actuates switch 370, in some embodiments the signal delay may be generated by switch 370 and in other embodiments the delay may be created by the ON-OFF valve 360. The possible sources of power for the functioning of the ON-OFF valve 360 and/or switch 370, such as a battery or solar-power, are known to those skilled in the art.

In various other embodiments switch 370 may not be activated by the flush handle 330, rather it may be a proximity, a smell, or a voice/sound activated sensor, an optical/motion sensor or the like, generating a signal upon sensing a user or sensing a user's use of the toilet. This sensor 370 will send an ON signal to the ON-OFF valve 360 to fill up tank 320 so that when the user activates the flush handle 330 there is water in the tank 320. In some similar embodiments, the system may be configured not only to fill up tank 320 with an ON signal upon sensing a user, but also to fill up tank 320 for a second time after the flush handle 330 is actuated. In such embodiments if the tank 320 is full when the next user is sensed, the ON signal will not be able to further fill up the tank 320 before a flushing, but will fill the tank 320 after the flushing.

In yet other embodiments every other activation of the flush handle 330 may send an ON signal to the ON-OFF valve 360 or the ON-OFF valve 360 may fill tank 320 upon receiving every other ON signal. In these embodiments tank 320 remains empty until a user activates the flush handle 330 to fill up tank 320 and subsequently to activate the flush handle 330 once more to flush the toilet and empty tank 320 for the next user. In other similar embodiments the signal to fill tank 320 may be generated by sitting on or lifting the toilet seat while the activation of the flush handle 330 will flush the toilet and will empty tank 320.

In some other embodiments the ON-OFF valve 360 may be configured to fill up tank 320 consecutively for a certain desired number of times upon each activation of the flush handle 330 and/or each sensing of the presence of a user or absence of a user. For example if the ON-OFF valve 360 is configured to fill tank 320 two successive times, it will attempt to fill the tank 320 once it encounters a user and once after the user flushes the toilet. While it is preferable, in most embodiments, for each filling of the tank 320 to be limited by time (e.g. 60 seconds), in some embodiments the number of fillings of the tank 320 may be defined as the number of times the water level rises to a certain predetermined height in tank 320. The water level may be sensed and fed back to the ON-OFF valve 360 by several means known to those skilled in the art.

Again, with the present-day designs, failure of the toilet flapper valve to drop and cover the valve seat will cause the water to continue flowing at a high rate and be wasted through the valve seat until a user notices the continuous flow and resolves the problem. However, with the presently disclosed design the timer of the ON-OFF valve will limit the water loss to no more than the volume released in one-minute or in some embodiments to a predetermined number of minutes. Once the flush is activated, the ON-OFF valve will open, for example, for only one-minute.

Also, with the disclosed design, when the flapper is lifted off the valve seat, water gushes into the toilet bowl at a high rate, and as soon as the water level starts dropping, the ball shut-off valve (inlet valve) will allow water flow into the tank. Because the water exiting through the valve seat is at a higher rate than the water flowing into the tank, the water level will eventually drop to the level of the valve seat and water flow into the bowl will cease. The fact that water starts flowing into the tank while there is water exiting through the valve has two distinct effects. First, more water will actually leave the tank than is stored in the tank prior to initiation of the flush. This may be a desired effect and allow for the delivery of a larger volume of water than that which could be stored in the tank for each flush. The second effect is that the speed of descent of the flapper is reduced. If water were not entering the tank, the flapper would fall faster. This may reduce the possibility of the flapper getting stuck halfway. Configuring a short (e.g. ten-second) delay in the actuation of the valve will allow this to happen, while such water flow regulation is not possible with the currently available systems.

Failure of the ball shut-off valve (inlet valve) to completely stop the water flow allows for slow leaks that will result in water loss through the overflow tube. With the new design, the water flow into the tank is, for example, for only one minute. If the tank would ordinarily fill in 50 seconds and there is a slow leak, there will only be 10 seconds of water leak into the toilet bowl via the overflow tube.

The application of this concept to other water dispensing devices that may potentially be a source of leaks and floods is similar to those described above for the toilet system. While several embodiments of the new system have been described above, those skilled in the art realize that there are numerous variations of this system that can benefit from the present disclosure without changing the spirit of the proposed technique.

Those skilled in the art will recognize that many other types of ON-OFF valves that are in communication with the flush actuator and/or sensors are possible without departing from the spirit of the present disclosures.

Changes can be made to the claimed invention in light of the above Detailed Description. While the above description details certain embodiments of the disclosed method and system and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of flushing a toilet, the method comprising:
controlling water flow to toilet water tank by a controllable water valve having an OFF default state, wherein the controllable water valve is controlled by a signal generated by a user actuating a toilet flush handle;
sending the signal to the controllable water valve, some or every time that the user actuates the toilet flush handle;
turning ON the water flow to the toilet water tank upon receiving the signals;
turning OFF the water flow to the toilet water tank after a predetermined length of time and/or after water level in the toilet water tank reaches a predetermined height; and
releasing the water into toilet bowl, wherein the water tank remains empty while the water valve remains in the OFF default state.

2. The method of claim 1, wherein the controllable water valve is controlled electrically, mechanically, wirelessly, or by a combination thereof.

3. The method of claim 1, wherein the predetermined length of time for the water flow is 60 seconds each time.

4. The method of claim 1, wherein the controllable water valve turns on every time or every other time that the signal is received.

5. The method of claim 1, wherein the signal is sent to the controllable water valve every time or every other time that the toilet flush handle is actuated.

6. The method of claim 1, further comprising delaying generation of the signal, transmission of the signal, or activation of the water flow by the predetermined length of time.

7. The method of claim 1, wherein the controllable water valve is battery operated or solar powered and wherein the signal is generated by a switch triggered by the activation of the toilet flush handle and wherein the signal is carried by an electrical wire from the switch to the controllable water valve.

8. A leakage and flood preventive toilet flushing system, the system comprising:
- a controllable water valve having an OFF default state for controlling water flow to toilet water tank; and
- a signal generator, for generating a signal when a toilet flush handle is activated, wherein the signal generator is in signal communication with the controllable water valve, and wherein the controllable water valve turns the water flow ON for a predetermined length of time or until water level is at a predetermined height within the toilet water tank upon receiving the signal from the signal generator and wherein the water tank is emptied in toilet bowl after in the water tank reaches a certain height or after the predetermined length of time, wherein water tank remains empty as long as the water valve is in OFF state.

9. The system of claim 8, wherein the signal is electrical, mechanical, electromagnetic wave, or a combination thereof.

10. The system of claim 8, wherein the predetermined length of time for the water flow is 60 seconds each time.

11. The system of claim 8, wherein the controllable water valve turns on every time or every other time that the signal is received.

12. The system of claim 8, wherein the signal is sent to the controllable water valve every time or every other time that the toilet flush handle is actuated.

13. The system of claim 8, further comprising delaying generation of the signal, transmission of the signal, or activation of the water flow by the predetermined length of time.

14. The system of claim 8, wherein the controllable water valve is battery operated or solar powered and wherein the signal is generated by a switch triggered by the activation of the toilet flush handle and wherein the signal is communicated to the controllable water valve by an electrical wire.

15. A method of water management of a toilet, the method comprising:
- controlling water flow to toilet water tank by a controllable water valve having an OFF default state, wherein the controllable water valve is controlled by a control and wherein the water tank remains empty as long as the water valve is in the OFF default state;
- generating the control signal, by a sensor, for controlling the controllable water valve, wherein the sensor senses arrival, presence, or departure of a user and generates the control signal;
- sending the generated control signal to the controllable water valve;
- turning ON, a predetermined number of times, the water flow to the toilet water tank after receiving the control signal;
- turning OFF, by the controllable water valve, the water flow to the toilet water tank after a predetermined length of time and/or after the water level in the toilet water tank reaches a predetermined height; and
- releasing the tank water into the bowl.

16. The method of claim 15, wherein the sensor is smell, proximity, movement, or pressure sensor.

17. The method of claim 15, wherein the predetermined length of time for the water flow is 60 seconds each time.

18. The method of claim 15, wherein the controllable water valve turns on every time or every other time that the signal is received.

19. The method of claim 15, wherein the signal is generated and/or sent to the controllable water valve every time or every other time that the user approaches, sits on, uses, or walks away from the toilet.

20. The method of claim 15, further comprising delaying, by a different predetermined length of time, generation of the signal, transmission of the signal, or activation of the water flow.

* * * * *